United States Patent [19]

Pinkston et al.

[11] Patent Number: 4,919,035
[45] Date of Patent: Apr. 24, 1990

[54] MUZZLE BRAKE AND TOOL FOR INSTALLATION

[76] Inventors: Mark C. Pinkston; Margarita Pinkston, both of P.O. Box 635, Kailua, Hi. 96734-0635

[21] Appl. No.: 319,321

[22] Filed: Mar. 6, 1989

[51] Int. Cl.$^5$ .................. F41C 21/18; B23B 5/00; B23B 3/02
[52] U.S. Cl. ........................... 89/14.3; 408/201; 408/216; 408/239 R; 408/204; 408/80
[58] Field of Search .............. 408/80, 199, 200, 201, 408/215, 216, 221, 239 R, 203.5, 204; 82/113, 110; 89/14.3

[56] References Cited

U.S. PATENT DOCUMENTS

| 764,341 | 7/1904 | Bond | 408/80 |
| 1,863,067 | 6/1932 | Perry | 408/80 |
| 2,164,570 | 7/1939 | Christman | 408/203.5 |
| 3,138,991 | 6/1964 | Malter | 89/14.3 |
| 3,344,451 | 10/1967 | Finch | 408/80 |
| 3,540,329 | 11/1970 | Gill | 82/113 |
| 4,577,532 | 3/1986 | Cavalli | 82/113 |

FOREIGN PATENT DOCUMENTS 2725225 12/1978 Fed. Rep. of Germany ... 408/203.5

Primary Examiner—Deborah L. Kyle
Assistant Examiner—Michael J. Carone
Attorney, Agent, or Firm—Fleit, Jacobson, Cohn, Price, Holman & Stern

[57] ABSTRACT

A muzzle brake and tool for effectively installing the brake on the muzzle end of a rifle without the necessity of engaging the services of a gunsmith. The tool for installation includes a handle assembly, a bore pilot and an insertable threading die and cutter and cutter holder by which the owner of the rifle can effectively trim the end of the barrel and then form threads on the external surface of the barrel onto which the muzzle brake can be screw threaded. The muzzle brake is a hollow cylindrical member having an internally threaded end engaged with the externally threaded end of the muzzle of the rifle together with two flat sides and four vents extending horizontally when installed on the rifle barrel with the vents being equally spaced and equally sized and communicating the hollow interior of the muzzle brake with the atmosphere to release gases thereby reducing recoil felt when the gun is fired.

6 Claims, 1 Drawing Sheet

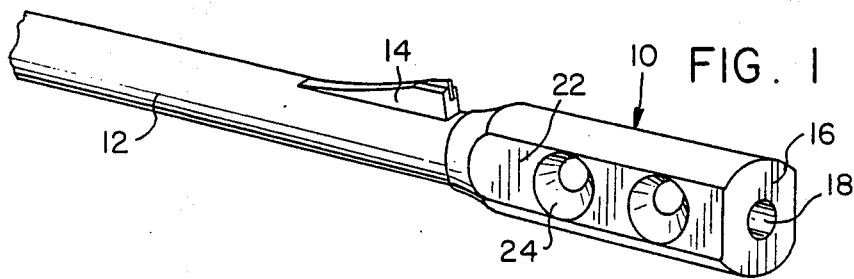
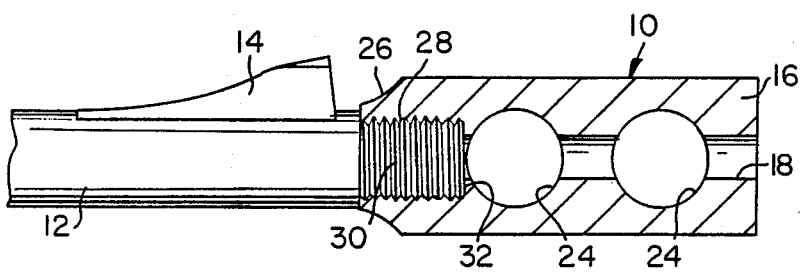
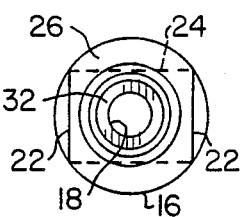
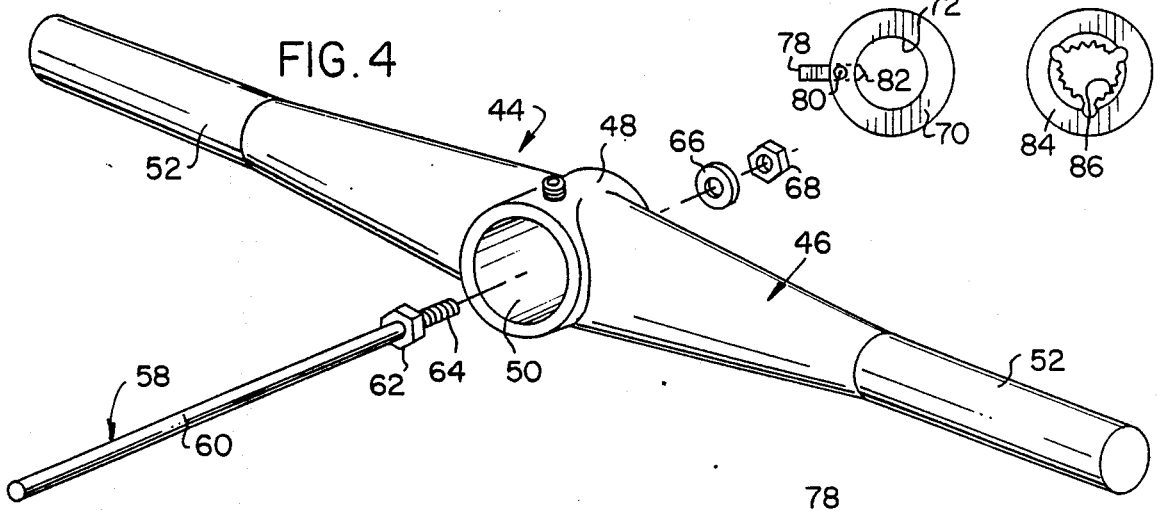
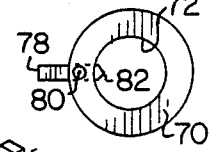
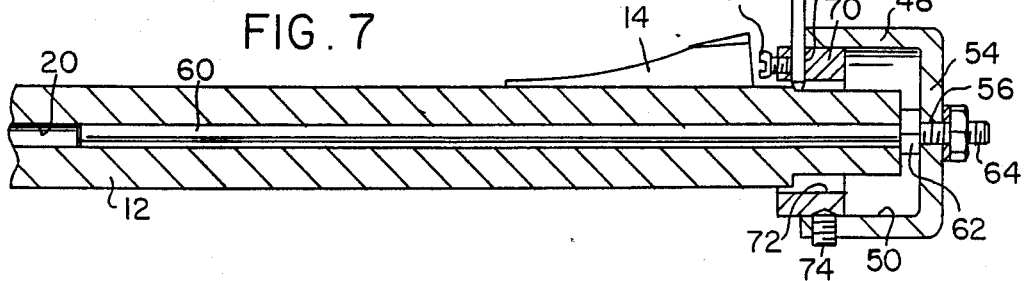
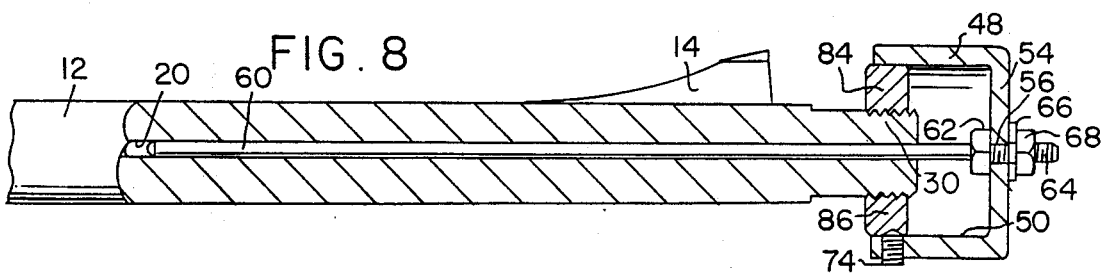

4,919,035

MUZZLE BRAKE AND TOOL FOR INSTALLATION

BACKGROUND OF THE INVENTION

1. Field of the Invention

The present invention generally relates to a recoil system for a rifle and more particularly a muzzle brake and a tool for effectively installing the brake on the muzzle end of a rifle barrel without the necessity of engaging the services of a gunsmith. The tool for installation includes a handle assembly, a bore pilot and an insertable threading die and cutter and cutter holder by which the owner of the rifle can effectively trim the end of the barrel and then form threads on the external surface of the barrel onto which the muzzle brake can be screw threaded. The muzzle brake is a hollow cylindrical member having an internally threaded end engaged with the externally threaded end of the muzzle of the rifle together with two flat sides and four vents extending horizontally when installed on the rifle barrel with the vents being equally spaced and equally sized and communicating the hollow interior of the muzzle brake with the atmosphere to release gases thereby reducing recoil felt when the gun is fired.

2. Information Disclosure Statement

Rifles and other long guns frequently are provided with muzzle brakes, chokes and the like which basically are extensions on the end of the gun barrel that are secured in place by a screw threaded connection with the muzzle brake enabling the lateral release of gases to reduce recoil. Usually, it is necessary to have a gunsmith attach a muzzle brake to a rifle barrel thus necessitating the transport of the gun to the gunsmith and usually leaving it for a long period of time until the gunsmith can modify the gun barrel and attach the muzzle brake.

SUMMARY OF THE INVENTION

An object of the invention is to provide a muzzle brake and an installation tool for enabling a gun owner to attach a muzzle brake to the barrel of a rifle with the tool including a handle having an insertable cutter assembly and an insertable threading die assembly mounted on a bore pilot extending into the bore of the rifle barrel in order to accurately align the handle with the barrel and the bore in the barrel thereby assuring that the external threads formed on the gun barrel will be coaxial with the center of the bore in the barrel.

Another object of the invention is to provide a muzzle brake and installation tool in which the muzzle brake is of cylindrical construction provided with flat side surfaces that enables a wrench to be used to secure the muzzle brake screw threadedly to the end of a rifle barrel with two openings or vents being provided in the flat sides to release gases laterally to reduce recoil with the vents being horizontally disposed when the rifle is in use thereby assuring that lateral forces exerted by reaction of the gases being released will be balanced.

A further object of the invention is to provide a muzzle brake and installation tool in accordance with the preceding objects which is relatively simple to use thereby enabling a gun owner to do it himself without the necessity of carrying the gun to a gunsmith to install the muzzle brake with the tool and muzzle brake being relatively simple in construction and easy to operate with the muzzle brake being accurately and positively mounted on the rifle barrel thereby enabling the muzzle brake to operate effectively to reduce recoil felt when the rifle is fired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the muzzle brake of the present invention mounted on the muzzle end of a rifle barrel.

FIG. 2 is a longitudinal, sectional view of the muzzle brake.

FIG. 3 is an end view of the muzzle brake.

FIG. 4 is a perspective view of the handle and bore pilot in disassembled relation.

FIG. 5 is an end view of the cutter holder and cutter.

FIG. 6 is an end view of the thread forming die.

FIG. 7 is a sectional view of the installation tool with a cutter and cutter holder mounted therein and the bore pilot associated with the rifle barrel for alignment purposes.

FIG. 8 is a view similar to FIG. 7 illustrating a thread forming die mounted in the handle for forming an external thread on the rifle barrel.

DESCRIPTION OF THE PREFERRED EMBODIMENT

Referring now specifically to the drawings, the muzzle brake of the present invention is generally designated by the numeral 10 and in FIG. 1 is illustrated in mounted relation to a rifle barrel 12 having the usual blade sight or other similar sight 14 mounted thereon. The muzzle brake 10 includes a cylindrical body 16 provided with a longitudinally extending central bore 18 therein which has a diameter equal to the internal diameter of the bore 20 in the barrel 12. The surface of the cylindrical body 16 is flattened on opposite sides thereof as indicated by numeral 22 with the flat surfaces extending throughout the length of the body 16. The flat surfaces 22 facilitate the use of a wrench to secure the body 16 to the gun barrel 12. Each side of the body 12 includes two equally spaced openings or vents 24 of circular configuration and which are in alignment with each other and which communicate with the bore 18. The two vents are disposed closer to one end of the body 16 and the other end of the body 16 is tapered as at 26 to generally merge with the exterior surface of the barrel 12. Also, the tapered end of the body 16 is internally threaded as designated by numeral 28 with the internal threads matching the external threads 30 on the barrel 12. The juncture between the internal threads 28 and the bore 18 in the muzzle brake defines a shoulder 32 which limits the rotational movement of the muzzle brake onto the barrel with the end of the barrel abutting the shoulder 32 when the muzzle brake is securely mounted on the rifle barrel. As illustrated, the vent openings 24 are horizontally disposed when the rifle is in position for firing and the vent openings permit release of propellant gases as the bullet exits from the muzzle brake thereby reducing the recoil felt when the rifle is fired.

The installation tool for installing the muzzle brake 10 is generally designated by numeral 44 and includes a handle assembly 46. The handle assembly 46 includes a central cylindrical body 48 having an internal cylindrical socket or pocket 50 therein and a laterally extending handle extending from each side thereof as indicated by numeral 52 so that the laterally extending handles 52 can be grasped and the tool rotated in the manner of a threading die handle. One side of the body 48 is closed by a back plate 54 having a small internally threaded opening 56 therein as illustrated in FIGS. 3 and 4.

A bore pilot generally designated by the numeral 58 is provided for insertion into the bore 20 of the rifle barrel 12. The bore pilot includes an elongated cylindrical rod 60 having a nut or flange 62 adjacent one end with the portion of the rod outwardly of the flange being externally threaded at 64. The external threaded portion 64 on the bore pilot extends through the internally threaded opening 56 and is threaded therein with a washer 66 and nut 68 mounted on the threaded end 64 to securely lock the rod member to the back plate 54 and in perpendicular relation thereto so that the accurately machined and hardened steel rod will be coaxial with the internal surface of the cylindrical socket 50 and will closely fit into and slide into and be rotatably received in the bore 20 of the rifle barrel 12. This assures that the handle assembly 46 will rotate about an axis coincidental to the center of the barrel bore.

A cutter holder 70 is inserted into the socket 50 with the cutter holder being a cylindrical member provided with a central bore 72 therein that is sufficiently large to be positioned over the bore pilot and rifle barrel 20. The cylindrical cutter holder 70 is secured in the socket by a set screw 74 extending through and threaded through the wall of the socket 50 thereby enabling insertion and removal of the cutter holder. The cutter holder 70 includes a radially extending passage 76 at one edge thereof which receives a cutter bar 78 therein with the cutter bar being adjustably secured radially in the passageway 76 by a set screw 80. The cutter is also made of hardened steel and is provided with a sharpened and pointed inner end 82 which when properly adjusted will engage the exterior of the rifle barrel 12 in order to trim the exterior of the rifle barrel in a manner that enables threads to be more easily formed thereon.

After the cutter has been used, the cutter holder 70 is removed by releasing the set screw 74. A threading die 84 is then inserted into the socket 50 and secured in place by the set screw 74. The threading die is of cylindrical construction and the same size as the cutter holder insofar as the external diameter is concerned. The interior of the threading die includes segmented thread forming members 86 in the form of a conventional threading die which will form threads on the trimmed exterior of the rifle barrel 12. After the external threads have been formed on the barrel 12, the tool 44 is removed and the muzzle brake 10 installed by screw threading the muzzle brake onto the end of the rifle barrel.

The diameter of the bore pilot as well as the size of the threading die and internal bore in the muzzle brake will vary depending upon the caliber of the rifle barrel with which the muzzle brake is associated. The muzzle brake may be approximately 2" in length and 0.825" in diameter with the flats being ¼" wide. The overall length of the handle assembly may be 12" and the bore pilot may be 6". As indicated, thread forming die segments may be provided to produce external threads having a desired characteristic for enabling the muzzle brake to be threaded thereon and positioned in such a manner that the vents or openings are horizontally disposed. When the muzzle brake is attached to the muzzle end of a rifle barrel, it will reduce the recoil felt when the rifle is fired inasmuch as gases are released through the vents thereby alleviating recoil.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tool for installing a muzzle brake on a rifle barrel comprising a handle assembly, a bore pilot mounted on the handle assembly and including a cylindrical rod insertable into the muzzle end of the rifle barrel to align the handle assembly with the axis of the bore in the rifle barrel, a cutter assembly mounted in the handle assembly for trimming the end of the rifle barrel, a threading die assembly mounted in the handle assembly subsequent to use of the cutter assembly to form external threads on the muzzle end of the rifle barrel, said handle assembly including a socket removably receiving the cutter assembly and threading die assembly, said socket including a set screw to secure the cutter assembly and threading die assembly in the socket, said cutter assembly including a cylindrical holder received in said socket, a radial passage in said holder, a radially adjustable cutter bar mounted in said passage, and a set screw securing said cutter bar in adjusted position to engage the inner end thereof with the exterior of the rifle barrel.

2. The tool as defined in claim 1 wherein said threading die assembly includes a cylindrical hollow body received in said socket, the interior of said body having a plurality of circumferentially spaced thread forming segments thereon.

3. The tool as defined in claim 1 wherein said cylindrical rod includes a threaded end portion positioned outwardly of the muzzle end of the barrel, said socket including a plate spaced from the muzzle end of the rifle barrel, said plate having an opening therethrough receiving the threaded end of the cylindrical rod, and retaining nuts on the threaded end of the cylindrical rod engaging the inner and outer surfaces of the plate to secure the cylindrical rod to the handle assembly.

4. A tool for forming an external thread on the muzzle end of a gun barrel comprising a handle assembly including laterally extending handles, a pilot rod mounted centrally of the handle assembly and freely slidably and rotatably received in the gun barrel for orienting and guiding the handle assembly during rotational and axial movement thereof, said handle assembly including centrally located mounting means thereon, a cutter assembly mounted on said mounting means, releasable securing means removably retaining the cutter assembly on the mounting means to enable removal of the cutter assembly and a threading die assembly mounted on the mounting means subsequent to the cutter assembly to form external threads on the muzzle end of the barrel when the handle assembly is rotated and moved axially toward the muzzle end of the barrel, said cutter assembly including a holder mounted on the mounting means and including a radially extending cutter element adjustably mounted on the holder and means securing the cutter element in radially adjusted position to engage the exterior of the muzzle end of the barrel.

5. The tool as defined in claim 4 wherein said threading die assembly includes a hollow body mounted on said mounting means, the interior of said hollow body having a plurality of circumferentially spaced thread forming segments thereon.

6. The tool as defined in claim 5 wherein said mounting means on the handle assembly includes a socket formed on the handle assembly, said cutter element holder and body of the threading die assembly being telescopically received in said socket, said releasable securing means including a locking screw on the handle assembly engaged with the cutter assembly and threading die assembly to removably retain the cutter assembly and threading die assembly in the socket.

* * * * *